United States Patent [19]

Azuma

[11] Patent Number: 4,838,137
[45] Date of Patent: Jun. 13, 1989

[54] APPARATUS FOR INTRODUCING A BELT-SHAPED MATERIAL TO A CUTTING MACHINE

[75] Inventor: Toshio Azuma, Tokyo, Japan

[73] Assignee: Bridgestone Corporation, Tokyo, Japan

[21] Appl. No.: 21,940

[22] Filed: Mar. 5, 1987

[30] Foreign Application Priority Data

Mar. 5, 1986 [JP] Japan .................................. 61-47919

[51] Int. Cl.⁴ .............................................. B26D 5/20
[52] U.S. Cl. .......................................... 83/42; 83/56; 83/208; 83/210; 83/220; 83/272; 83/369; 83/402; 83/614; 83/650; 83/925 R; 156/406; 156/406.4; 198/369; 198/435; 198/448; 226/110
[58] Field of Search ...................... 83/42, 56, 208, 210, 83/220, 272, 369, 402, 486.1, 614, 650, 925 R; 198/435, 369, 448; 226/109, 110; 156/405.1, 406, 406.4

[56] References Cited

U.S. PATENT DOCUMENTS

| | | | |
|---|---|---|---|
| 2,551,762 | 5/1951 | Pfeiffer | 83/650 X |
| 3,358,831 | 12/1967 | Cothrell | 198/435 X |
| 3,565,725 | 2/1971 | Siempelkamp | 198/435 X |
| 3,732,767 | 5/1973 | Habert | 83/614 X |
| 3,789,712 | 2/1974 | Enders | 83/614 X |
| 3,841,941 | 10/1974 | Lebland et al. | 156/406 |
| 4,545,718 | 10/1985 | Marshall | 156/406.4 X |

FOREIGN PATENT DOCUMENTS 25950 2/1983 Japan .

Primary Examiner—Donald R. Schran
Assistant Examiner—Eugenia A. Jones
Attorney, Agent, or Firm—Sughrue, Mion, Zinn, Macpeak & Seas

[57] ABSTRACT

In an apparatus for introducing a belt-shaped material to a cutting machine, stationary conveyors are laid vertically in such a manner as to form different angles with respect to the cutting machine and combined respectively, with lift conveyors which are also laid vertically to convey belt shaped materials to the cutting machine. The lift conveyors are moved vertically by lifting means unit a desired one of the lift conveyors comes to the belt-shaped material introducing position of the cutting machine.

6 Claims, 2 Drawing Sheets

APPARATUS FOR INTRODUCING A BELT-SHAPED MATERIAL TO A CUTTING MACHINE

BACKGROUND OF THE INVENTION

Field of the Invention

This invention relates to an apparatus which, in order to cut tire forming belt-shaped materials at different angles, introduces the belt-shaped materials at different angles to the cutting machine.

One example of an apparatus of this type has been disclosed, for instance, by Japanese Patent Application (OPI) No. 25950/1983 (the term "OPI" as used herein meaning "an unexamined published application"). The conventional apparatus is made up of a sector-shaped auxiliary stand provided beside the cutting machine. Additionally, a tire cord introducing device is swingable about the center of the sector-shaped auxiliary stand and is adapted to introduce tire cords to the cutting machine through the sector-shaped auxiliary stand. In the apparatus thus constructed, the tire cord cutting angle is changed by swinging the tire cord introducing device.

However, the apparatus suffers from a difficulty that arises from the fact that the tire cord introducing device is considerably large in weight. Therefore, in order to change the cutting angle a large high-power locking mechanism is required and it takes a relatively long time to accomplish the swinging of the tire cord introducing device. That is, the apparatus displays low work efficiency.

SUMMARY OF THE INVENTION

Accordingly, an object of this invention is to eliminate the above-described difficulties accompanying a conventional apparatus for introducing a belt-shaped material to a cutting machine.

The foregoing object and other objects of the invention have been achieved by the provision of an apparatus which introduces a belt-shaped material to a cutting machine. According to the invention the apparatus comprises a plurality of vertically fixed conveyors for conveying belt-shaped materials. The vertically fixed conveyors are spaced vertically from each other in such a manner as to form different angles with respect to the cutting machine. A plurality of lift conveyors are provided for the respective stationary conveyors. The lift conveyors are arranged between the cutting machines and the vertically fixed conveyors and are spaced vertically from each other in such a manner as to be in parallel with the respective vertically fixed conveyors. Lifting means move the lift conveyors vertically until a desired one of the lift conveyors comes to a belt-shaped introducing position for the cutting apparatus.

It is assumed that a belt-shaped material is successively cut at a predetermined angle by the cutting machine. In this case, in the apparatus of the invention, only the belt-shaped material to be cut at the predetermined angle is conveyed to the cutting machine by the vertically fixed conveyor and the lift conveyor combined with the vertically fixed conveyor. Furthermore, the lift conveyor introducing the belt-shaped material to the cutting machine is located at the belt-shaped material introducing position of the cutting machine. When the cutting angle is changed, a belt-shaped material corresponding to the new cutting angle is selected, and the lift conveyor on which the belt-shaped material thus selected is laid is moved to the belt-shaped material introducing position by operating the lifting means. Under this condition, the vertically fixed conveyor and the lift conveyor which convey the selected belt-shaped material are operated so that the belt-shaped material is successively introduced to the cutting machine. That is, in the apparatus of the invention, the cutting angle can be changed merely by vertically moving the lift conveyors which are light in weight. Therefore, in the apparatus of the invention, the lifting means can be small both in size and in weight, and accordingly the work efficiency is much improved.

The nature, principle and utility of the invention will become more apparent from the following detailed description when read in conjunction with accompanying drawings, in which like parts are designated by like reference numerals.

BRIEF DESCRIPTION OF THE INVENTION

FIGS. 1 and 2 are a front view and a plan view, respectively, showing one example of an apparatus for introducing a belt-shaped material to a cutting machine according to this invention.

DETAILED DESCRIPTION OF THE INVENTION

An apparatus for introducing belt-shaped materials to a cutting machine, which is one embodiment of this invention, will be described with reference to the accompanying drawings.

Figure 1:
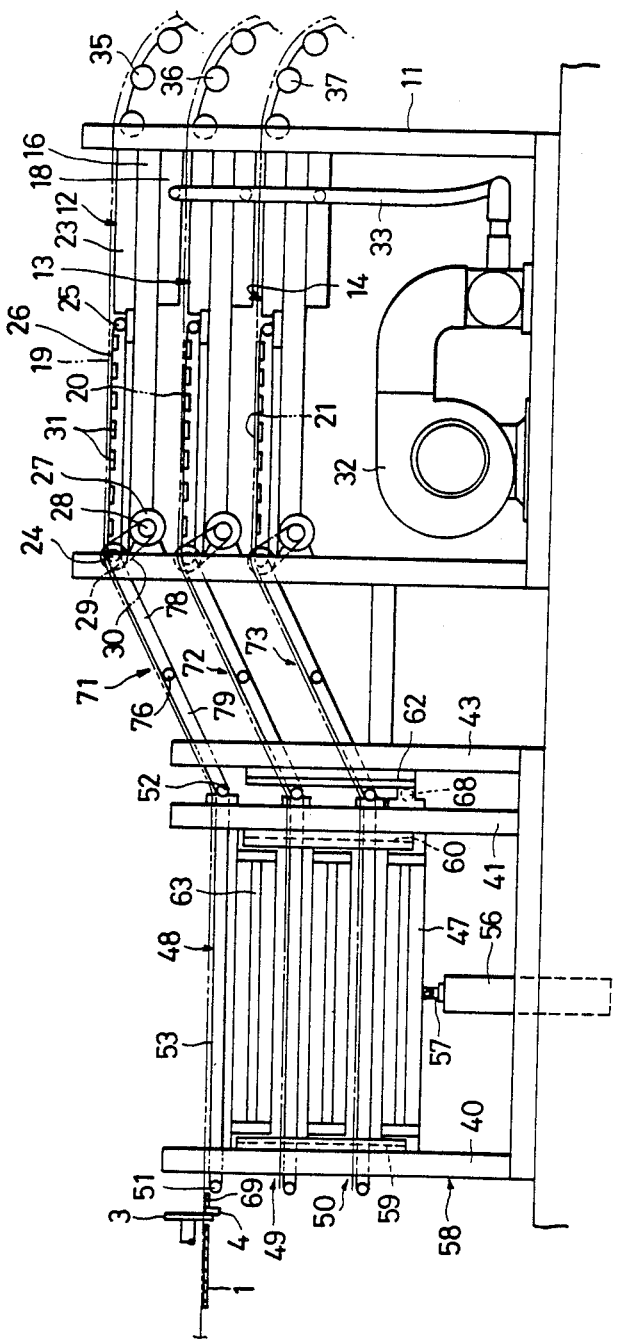
Figure 2:
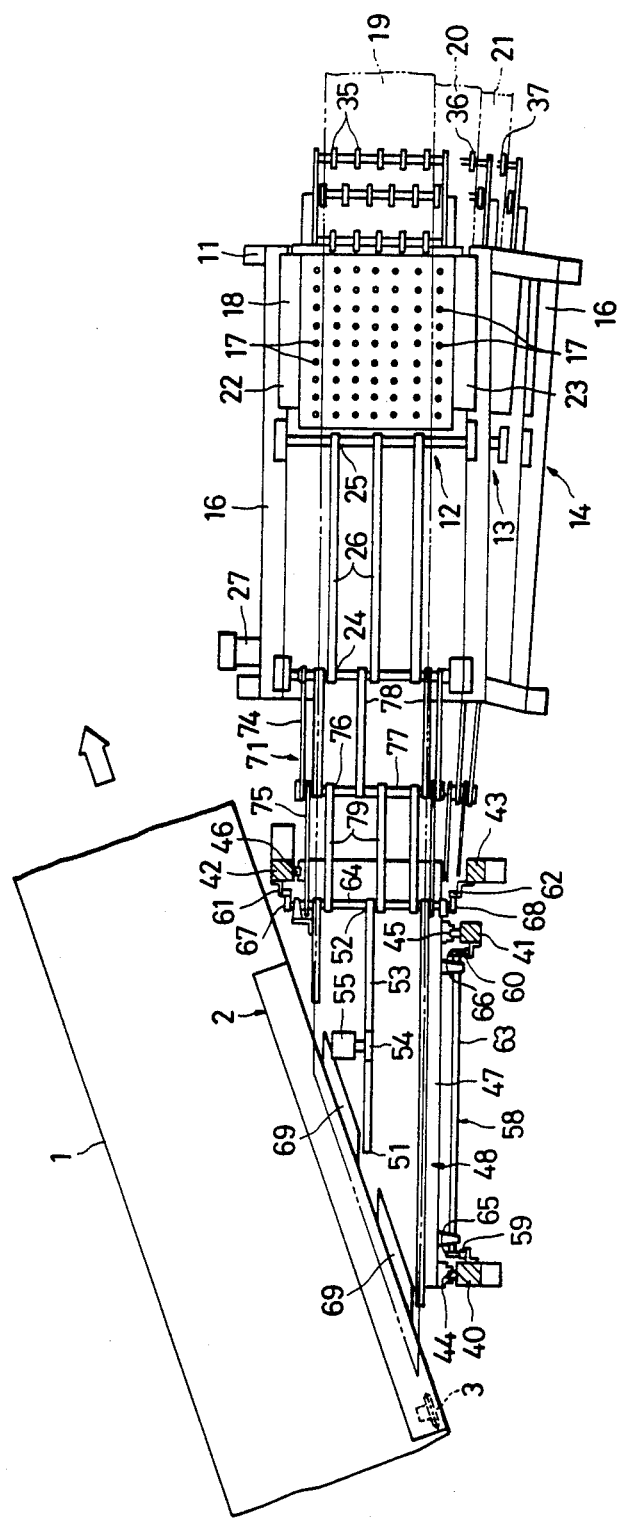

FIGS. 1 and 2 show a conveyor 1 which is run in the direction of the arrow. A cutting machine 2 is provided on one side of the conveyer 1 in such a manner that it is extended along one edge of the conveyor 1. The cutting machine 2 is adapted to cut a belt-shaped material (described later) at a predetermined angle with respect to the longitudinal direction of the belt-shaped material. The cutting machine 2 comprises a disk-shaped rotary upper edge 3 which can reciprocate in the longitudinal direction of the cutting machine and a lower edge 4 which is brought into contact with the upper edge and extended in the longitudinal direction of the cutting machine. A stationary frame 11 is provided beside the cutting machine 2 and has a plurality of vertically fixed conveyors (three stationary conveyers in the described embodiment) 12, 13 and 14 spaced vertically from each other. These vertically fixed conveyors 12, 13 and 14 are so arranged that they form different angles with the cutting machines. For instance, the conveyors 12, 13 and 14 form respective angles of 20°, 22° and 24° with the cutting machine. The vertically fixed conveyors 12, 13 an 14 have respective horizontal beams 16 secured to the stationary frame 11. The horizontal beams 16 have respective air boxes 18 having a number of jetting holes 17 in their upper surfaces. At the air boxes 18, centering mechanisms 22 and 23 support from both sides belt-shaped materials 19, 20 and 21, which are conveyed respectively by the vertically fixed conveyors 12, 13 and 14; in order to center them. Downstream of each of the air boxes 18, each horizontal beam 16 has a plurality of conveyor belts 26 laid over rollers 24 and 25. At each of the horizontal beams 16, the conveyors belts 26 are run by one of the belts 30 which is laid over the pulley 28 secured to the output shaft of a motor 27 which is fixed to the stationary frame 11 and over the pulley 29 secured to the roller 24. That is, at the horizontal beams 16, the conveyor belts 26 convey the centered beltshaped materials 19, 20 and 21 towards the cutting machine 2. A plurality of magnets 31 are arranged within the conveyor belts 26 to attract the steel cords of the belt-shaped materials 19, 20 and 21 to thereby prevent the displacement of the belt-shaped materials from the conveyor belts 26. A blower 32 is fixedly mounted on the stationary frame 11 and it is connected through hoses 33 to the respective air boxes 18. Guide rollers 35, 36 and 37 are provided upstream of the vertically fixed conveyors 12, 13 and 14, respectively. These guide rollers 35, 36, 37 are adapted to guide and feed the belt-shaped materials 19, 20 and 21 from their rolls to the respective stationary conveyors 12, 13 and 14.

Posts 40, 41, 42 and 43 are provided between the cutting machine 2 and the stationary frame 11. Vertical rails 44, 45 and 46 are secured to the respective posts 40, 41 and 42. A lift frame 47 is slidably supported by the rails 44, 45 and 46. The lift frame 47 has a plurality of lift conveyers (three lift conveyors in the embodiment) 48, 49 and 50 spaced vertically from each other. The lift conveyors 48, 49 and 50 are paired with the aforementioned vertically fixed conveyors 12, 13 and 14. More specifically, the lift conveyors 48, 49 and 50 are arranged to be elongations of and to be in parallel with the respective stationary conveyors 12, 13 and 14. The horizontal inclinations of the lift conveyors 49 and 50 are not show in FIG. 2 for sake of clarity.

Each of the lift conveyors 48, 49 and 50 comprises rollers 51 and 52 rotatably supported by the lift frame 47 and a plurality of conveyor belts 53 laid over the rollers 51 and 52. A touch roller 54 is in roll-contact with each of the conveyor belts 53. The rotations of these touch rollers 54 are detected by respective pulse generators 55. A piston rod 57 of a lifting means, namely, a cylinder 56 is coupled to the lift frame 47 at its end. Therefore, as the cylinder 56 operates, the lift conveyors 48, 49 and 50 are lifted together with the lift frame 47, and one of the lift conveyors 48, 49 and 50 is brought to the belt-shaped material introducing position of the cutting machine 2. The material introducing position is equal in height to the lower cutting edge 4 and occurs immediately before the lower cutting edge 4.

Further in FIGS. 1 and 2, a mechanism 58 maintains the lift frame 47 horizontal when the lift frame 47 is lifted (hereinafter referred to as "a horizontal mechanism 58"). The horizontal mechanism 58 comprises racks 59, 60, 61 and 62 mounted respectively on the posts 40, 41, 42 and 43. Pinions 65, 66, 67 and 68 are secured to the ends of rotary shafts 63 and 64 rotatably supported on the lift frame 47 in such a manner that the pinions are respectively engaged with the racks 59, 60, 61 and 62. Guide plates 69 are provided between the cutting machine 2 and the lift conveyors 48, 49 and 50 at the belt-shaped material introducing position so as to support and guide from below the belt-shaped material fed to the cutting machine 2 from the respective lift conveyor.

Further in FIGS. 1 and 2, coupling conveyors 71, 72 and 73 respectively couple the vertically fixed conveyors 12, 13 and 14 to the lift conveyors 48, 49 and 50, respectively. These coupling conveyors 71, 72 and 73 have arms 74 having first ends rotatably coupled to the vertically fixed conveyors 12, 13 and 14, and arms 75 having first ends rotatably coupled to the lift conveyors 48, 49 and 50. The remaining ends of these arms 74 and 75 are rotatably coupled to each other through rotary shafts 77 having rollers 76. A plurality of first conveyor belts 78 are laid over the rollers 24 and the rollers 76, while a plurality of second conveyor belts 79 are laid over the rollers 52 and the rollers 76. Accordingly, the rotary shafts 77 wound with the first and second conveyor belts 78 and 79 are held suspended. Therefore, when the lift conveyors 48, 49 and 50 are moved vertically, the displacement of the rotary shafts 77 is absorbed by the change in angle between the arms 74 and 75.

The operation of the belt-shaped material introducing apparatus thus constructed will now be described.

It is assumed that the piston rod 57 of the cylinder 56 has been maximally retracted. That is, the top lift conveyor 48 is at the belt-shaped material introducing position of the cutting machine 2. The beltshaped material 19 supplied from the roll, after being guided by guide rollers 35, reaches the air box 18, where it is centered by the centering mechanisms 22 and 23 while being kept floating by the streams of air jetted from the air jetting holes 17 of the air box 18. Thereafter, the belt-shaped material 19 is moved toward the cutting machine 2 by the conveyor belt 26 of the top stationary frame 12 while being attracted by the magnets 31. In succession, the belt-shaped material 19 is delivered to the top lift conveyor 48 by the first and second conveyor belts 78 and 79 of the top coupling conveyor 71 and to the cutting machine 2 by the conveyor belts 53 of the lift conveyor 48. In this operation, the conveyor belts 26, the first and second conveyor belts 78 and 79, and the conveyor belts 53 are run at the same speed, being laid on common rollers 24, 76 and 64. At the same time, the fed length of the belt-shaped material 19 is detected through the touch roller 54 by the pulse generator 55. When the length thus detected reaches a predetermined value, the motor 27 is stopped. Under this condition, the upper edge 3 of the cutting machine 2 is moved along the lower edge 4 so that the belt-shaped material 19 is cut at a predetermined angle with respect to the longitudinal direction of the belt-shaped material 19. After the upper edge 3 returns to its initial position, the belt-shaped material 19 is fed again and cut to a predetermined length.

The pieces of belt-shaped material 19 thus cut (hereinafter referred to as "a belt-shaped material pieces", when applicable) are delivered by the conveyor 1 in the direction of the arrow, and are joined at the end by a joining device to form a tire forming material such as a carcass layer, belt layer or breaker layer.

The cutting angle of the belt-shaped material with respect to its longitudinal direction is changed as follows. The piston rod 57 of the cylinder 56 is protruded until, for instance, the bottom lift conveyor 50 corresponding to the desired cutting angle comes to the belt-shaped material introducing position of the cutting machine 2. In this operation, the lift frame 47 and the lift conveyors 48 and 49 are also moved upwardly. The distance between the rollers 24 and 52 is changed in this movement. However, since the roller 76 is suspended and the arms 74 and 75 are rotatably coupled together, the arms 74 and 75 are bent to form an angle therebetween, thus absorbing the change of the distance between the rollers 24 and 52. Under this condition, the motor 27 for the bottom vertically fixed conveyor 14 is operated to feed the belt-shaped material 21 and the material 21 is cut into pieces similarly as in the above-described cases.

In the above-described apparatus, the cutting angle is changed merely y moving the lift conveyors 48, 49 and 50 vertically. However, if the guide plates 69 are caused to interfere with the lift conveyors 48, 49 and 50 when the lift conveyors are moved vertically as described above, then the interference should be eliminated by moving the lift conveyors 48, 49 and 50 forwardly or backwardly.

In the above-described apparatus, the lift conveyors 48, 49 and 50 are moved as one unit. However, the apparatus may be so modified that the lift conveyors 48, 49 and 50 are provided with separate lifting means so that they are individually moved vertically.

Furthermore, in the above-described apparatus, in order to prevent the displacement of the belt-shaped material which has been centered, the magnets 31 are utilized to attract the steel cords. However, in the case where the tire cords are of textile, a number of vacuum suction holes may be provided immediately below the conveyor belt 26 to convey the non-magnetic cords while suctioning and retaining them.

In addition, in the above-described apparatus, three lift conveyors laid vertically are employed. However, the invention is not limited thereto or thereby. That is, two lift conveyors or more than three lift conveyors laid vertically maybe employed.

As is apparent from above described, in the apparatus of the invention, the belt-shaped material cutting angle can be readily changed merely by vertically moving the lift conveyors which are light in weight. Therefore, the lifting mechanism can be small both insize and in weight, which contributes to an improvement of the work efficiency of the apparatus.

What is claimed is:

1. A method of conveying a belt-shaped material to a cutting machine, comprising the steps of:
    conveying a plurality of belt-shaped materials in respective vertically stacked parallel horizontal first planes along respective first directions which are non parallel to each other in their respective horizontal planes:
    transferring said belt-shaped materials from a respective one of said first planes to a respective one of plurality of conveyors;
    conveying said transferred belt-shaped materials on said respective conveyor in a place parallel to said first planes along a first direction corresponding to a first direction of said respective first plane:
    moving said respective conveyor vertically to a position adjacent a belt-shaped introducing position of a cutting machine; and
    cutting said conveyed transferred belt-shaped materials.

2. An apparatus for introducing a belt-shaped material to a cutting machine, comprising:
    a cutting machine for a selected one of a plurality of belt-shaped materials to be cut along a first direction;
    a plurality of vertically fixed conveyors for conveying respective ones of said belt-shaped materials to said cutting machine along respective second directions, respective ones of said second directions forming different respective angles with said first direction, said vertically fixed conveyors being stacked vertically;
    a plurality of lift conveyors provided respectively for said vertically fixed conveyors for conveying said belt-shaped materials from respective ones of said vertically fixed conveyors along respective ones of said second directions, said lift conveyors being stacked vertically, disposed horizontally between said vertically fixed conveyors and said cutting machine and respectively in parallel with respective ones of said vertically fixed conveyors; and
    lifting means for vertically moving said lift conveyors to place a selected one of said lift conveyors adjacent to a belt shaped introducing position of said cutting machine.

3. An apparatus as recited in claim 2, wherein said vertically fixed conveyors and said lift conveyors convey said belt shaped materials substantially horizontally and further comprising a plurality of coupling conveyors coupling respective pairs of said vertically fixed and lift conveyors for conveying said belt shaped materials therebetween, said coupling conveyors being of variable vertical inclination.

4. An apparatus as recited in claim 2, wherein said lifting conveyors are carried on a lifting frame and said lifting means vertically moves said lifting frame.

5. An apparatus as recited in claim 2, wherein said lifting means independently vertically moves each of said lifting conveyors.

6. An apparatus for introducing a belt-shaped material to a cutting machine, comprising:
    a cutting machine for cutting a selected one of a plurality of belt-shaped materials to be cut along a first direction;
    a plurality of vertically fixed conveyors for conveying respective ones of said belt-shaped materials to said cutting machine along respective second directions, respective ones of said second directions forming different respective angles with said first direction, and vertically fixed conveyors being stacked vertically;
    a plurality of lift conveyors provided respectively for said vertically fixed conveyors for conveying said belt shaped materials from respective ones of said vertically fixed conveyors along respective ones of said second directions, said lift conveyors being stacked vertically, disposed horizontally between said vertically fixed conveyors and said cutting machine and respectively in parallel with respective ones of said vertically fixed conveyors; and
    lifting means for vertically moving said lift conveyors to place a selected one of said lift conveyors adjacent to a belt shaped introducing position of said cutting machine;
    wherein each of said vertically fixed conveyors comprises belts wound on a first roller shaft;
    wherein each of said lift conveyors comprises belts wound on a second roller shaft; and
    wherein each of said coupling conveyors comprises belts wound on a respective one of said first roller shafts and on a third roller shaft and belts wound on a respective one of said second roller shafts and windingly coupled to said third roller shaft, said third roller shaft being vertically moveable.

* * * * *